Dec. 28, 1954    E. B. FAIRCHILD    2,698,120
PROCESS AND APPARATUS FOR STERILIZING
AND FILLING CONTAINERS
Filed June 22, 1951    3 Sheets-Sheet 1

EDWIN BRADLEY FAIRCHILD,
INVENTOR.

BY Lyon & Lyon
ATTORNEYS

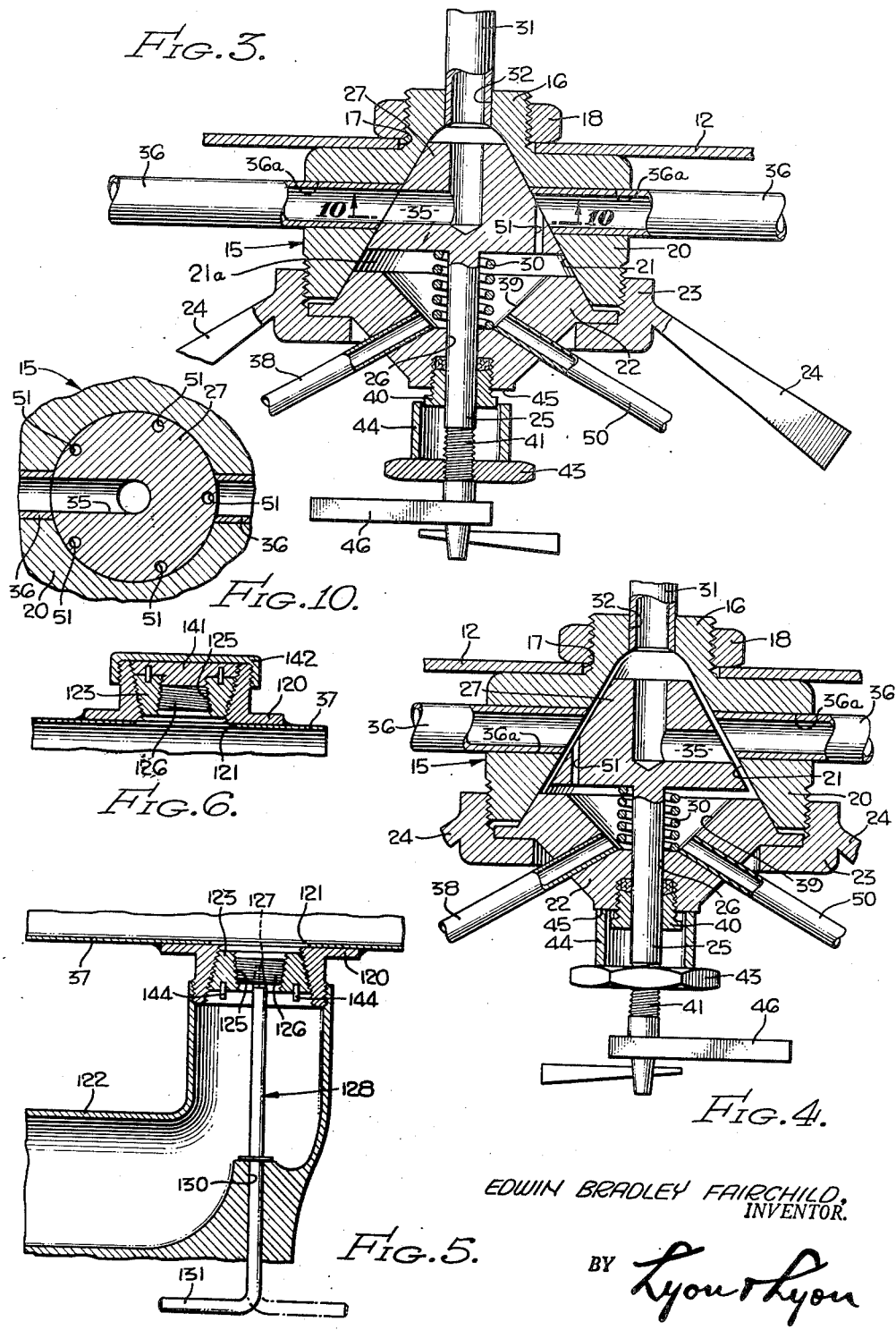

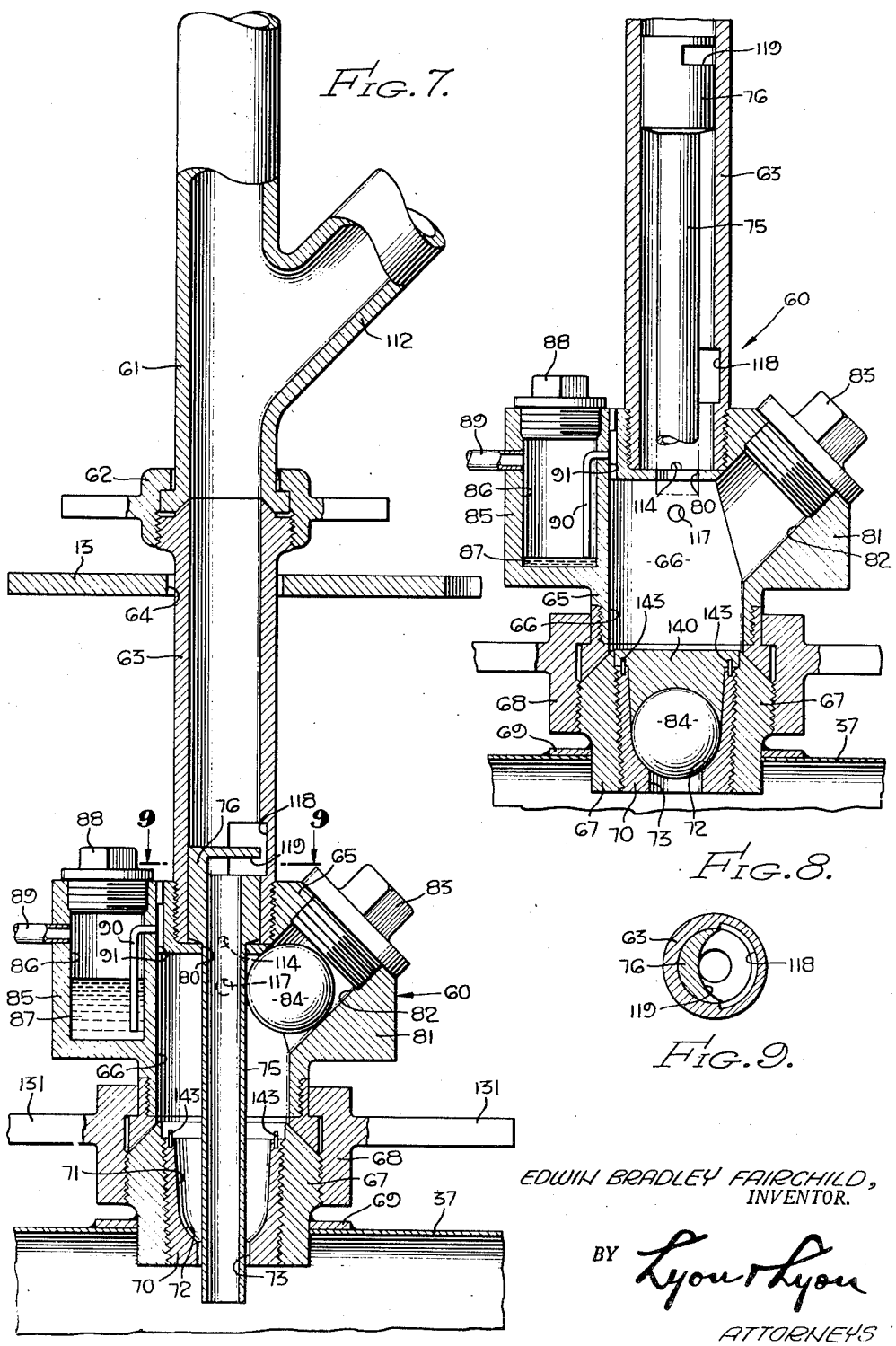

United States Patent Office 2,698,120
Patented Dec. 28, 1954

2,698,120

PROCESS AND APPARATUS FOR STERILIZING AND FILLING CONTAINERS

Edwin Bradley Fairchild, Santa Barbara, Calif., assignor, by mesne assignments, to Lindley W. Potts and Marvin Arent, both of Santa Barbara, Calif.

Application June 22, 1951, Serial No. 232,960

14 Claims. (Cl. 226—68)

This invention relates to the art of food processing, and has particular reference to a process and apparatus for sterilizing and filling containers with a sterile fluid under aseptic conditions.

It has been established that fresh milk may be pasteurized or sterilized and canned under aseptic conditions. Milk packaged in this manner is thus preserved in a fresh condition for months, even without the use of refrigeration. The aseptic canning methods and apparatus presently being used are not practicable for use in packaging milk or similar products in other than relatively small size containers, due to the size limitations inherent in the equipment itself. Fluids thus packaged are somewhat expensive since they are consumed in relatively large quantities by the individual users. It is therefore desirable, from an economic point of view at least, as well as a matter of convenience, that a means be provided for aseptically packaging fresh milk or the like in bulk quantities. Moreover, milk packaged in drums or barrels and adapted to be maintained in its fresh state over a period of months would have wide acceptance, particularly in the institutional market, for the armed forces and by the housewife, besides affording the dairy industry a means, other than butter production, for leveling its fluctuating milk producing cycles.

Accordingly, one of the principal objects of this invention is to provide a process and apparatus for the aseptic packaging in bulk of fresh milk or similar perishable liquid foods.

Another object of this invention is to provide a process and apparatus for sterilizing and filling containers such as drums or barrels with pre-sterilized fresh milk or the like, under conditions such that the material thus packaged may be maintained in a fresh, palatable condition for relatively long periods of time.

Another object of this invention is to provide a novel loading valve device for automatically sterilizing drums or barrels, filling the same with pasteurized or sterilized fresh milk or the like, and sealing the drums or barrels to prevent contamination of the contents.

Another object of this invention is to provide an apparatus for sterilizing and loading a plurality of containers, the apparatus being provided with a novel selector valve permitting sequential operations to be performed upon the individual containers.

Yet a further object of this invention is to provide apparatus of the character described including a selector valve device adapted to accept a continuous stream of sterile fluid and to direct the same to the containers to be loaded, the valve device being further provided with means for simultaneous sterilization of all of the containers in the system.

Other objects and advantages of this invention it is believed will be ready apparent from the following detailed description of a preferred embodiment thereof when read in connection with the accompanying drawings.

In the drawings:

Figure 3 is a sectional elevation taken substantially on the line 3—3 of Figure 1, illustrating the selector valve in position for loading one of the barrels.

Figure 4 is a view similar to Figure 3, but illustrating the selector valve in position for simultaneous sterilization of all of the barrels.

Figure 5 is a vertical sectional elevation illustrating the barrel condensate drain device.

Figure 6 is a vertical sectional elevation illustrating the condensate drain plug and cap.

Figure 7 is a side elevation of the loading valve device in position for sterilization of the barrel.

Figure 8 is a view similar to Figure 7, but illustrating the device in position after the barrel has been sterilized, loaded and sealed.

Figure 9 is a sectional elevation taken substantially on the line 9—9 of Figure 7.

Figure 10 is a sectional elevation taken substantially on the line 10—10 of Figure 3.

Figure 1:
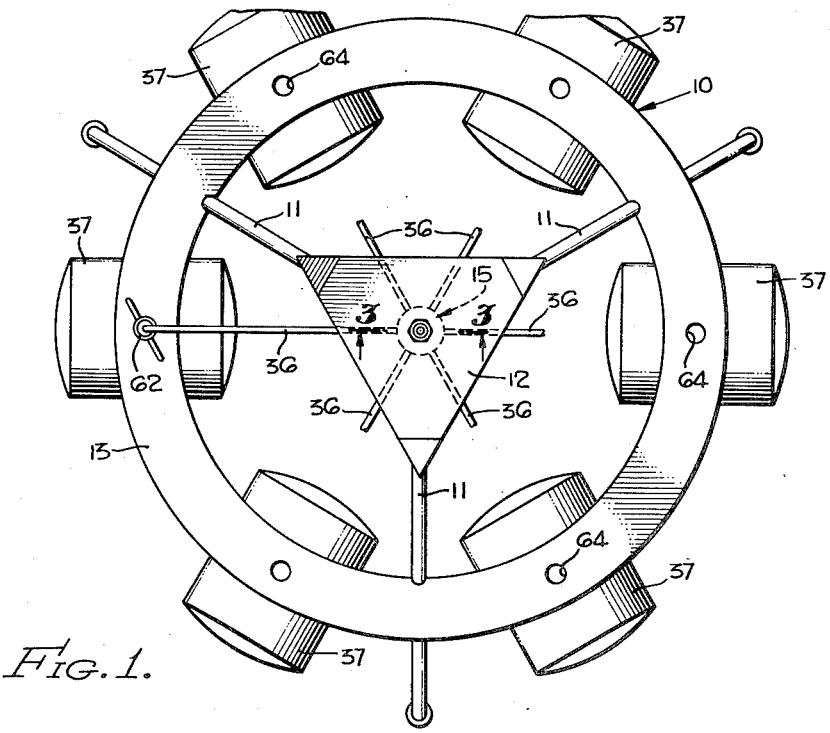
Figure 1 is a top plan view of the sterilizing and filling apparatus which embodies a preferred form of the invention.

Referring now to the drawings, the apparatus which embodies the invention includes a generally triangular frame 10 having support legs 11 secured at the top thereof to a triangular plate 12 and extending through an intermediate annular shelf 13.

Secured to the underside of the plate 12 is the selector valve generally indicated 15, said valve being provided with a threaded boss 16 inserted through an aperture 17 in the plate and secured thereto by means of a nut 18. The selector valve includes an upper body 20 having a conical chamber 21a the walls of which form a seat 21, and a lower body 22 secured to the upper body by means of flanged nut 23, the nut being provided with handles 24 permitting ready assembly and disassembly. A valve stem 25 extends through a cylindrical aperture 26 in the lower end of the lower body 22 and carries a conical valve member 27 normally urged in sealing relation with the seat 21 by means of the spring member 30. An inlet tube 31 for steam and sterile fluid extends through an inlet port 32 in the boss 16, communicating with the chamber 21d and in turn with the right-angled passage 35 provided through the valve member 27. The end of the passage 35 remote from the inlet tube 31 communicates with any one of the plurality of outlet tubes 36, each of which leads from an outlet port 36a to one of the barrels 37 to be filled. A steam condensate outlet 38, provided with a valve (not shown) leads from the bottom of the central opening 39 in the lower body 22.

Means are provided for unseating the valve member 27 to permit steam to flow from the inlet tube 31 and simultaneously through all of the outlet tubes 36. As shown in the drawings, particularly Figures 3 and 4, the valve stem 25, which is provided with a packing gland 40, is threaded as at 41 for the reception of nut 43. Carried on the nut is a cylindrical spacer member 44, which, upon rotation of the nut relative to the stem in a direction to move the nut from the position shown in Figure 3 to that illustrated in Figure 4, will be caused to bear against the annular end 45 of the lower valve body 22. Upon further relative rotation between the nut and valve stem, it will be understood that the valve member 27 will be brought down off its seat to the open position shown in Figure 4, whereby communication is established between the inlet tube 31 and each of the outlet tubes 36. When it is desired to selectively supply the individual outlet tubes 36 from the inlet tube, the nut 43 is returned to the position shown in Figure 3, and the valve member, now in closed or seated position may be axially moved to the desired position by turning the handle 46.

As will be more fully described below, by means of the selector valve 15, the entire system and all of the barrels are simultaneously sterilized with live steam at the start of a day's operations, and then an inert scavenging gas is fed through the outlet tubes and into the barrels to eliminate all steam and condensate therefrom. This is accomplished by means of an inlet line 50 which communicates with the central opening 39 for the delivery of inert gas thereto. A plurality of passages 51 are provided in the valve member 27, each leading from the central opening to one of the outlet tubes 36. The passages 51 are spaced with the outlet end of the passage 35 so that all of the outlet tubes, with the exception of the particular tube 36 which is in communication with the passage 35, are connected with the central chamber 39.

For example, in the particular embodiment shown, provision is made for the reception of six barrels on the frame 10, and hence there are six outlet lines from the selector valve, one to each barrel. Accordingly, there are provided five passages 51.

While, as pointed out above, it is preferred to provide connections for six barrels 37 in the frame 10, the connections for only a single barrel are shown in order to provide clarity of illustration. Each of the outlet tubes 36 is formed in an arc as shown in order to permit a slight amount of play in the ends thereof to facilitate making the connections with the empty barrels. The ends of the tubes are each connected to a loading valve device generally indicated 60. Each of these devices includes a Y fitting 61 to which is connected, by means of a flanged nut 62, an elongated cylinder member 63. The member 63 extends through an oversize aperture 64 in the shelf 13 and is threadedly connected at its lower end to the valve body 65.

The valve body 65, which is provided with a central opening 66, is connected to a nipple 67 by means of flanged nut 68, the nipple being permanently secured to the barrel 37 by means of welded flange 69. Threadedly engaged with the nipple is a plug 70 having a central chamber 71 terminating in a spherical seat 72 and an aperture 73 communicating with the interior of the barrel. A filling tube 75 is vertically slidably mounted in the valve device and is provided with a piston member 76 integral with the upper portion thereof which piston is adapted to be vertically reciprocated in the cylinder 63. The tube 75, when in the filling position shown in Figure 7, extends through an aperture 80 in the upper part of the valve body 65 and thence downwardly through the central opening 66 through the aperture 73 in the plug 70 into the interior of the barrel.

On one side of the valve body is a boss 81 having a bore 82, leading at an angle into the central opening 66. The bore is sealed off with a plug 83 and contains a spherical ball 84, the ball being retained in place by means of the filling tube 75. On the other side of the valve body is a boss 85 provided with a central chamber 86 forming a reservoir for paraffin 87 or similar sealing material. The chamber 86, which is sealed by means of a suitable plug 88, is further provided with a steam inlet line 89 and a stand pipe 90 leading from the lower portion of the chamber to a passage 91 which in turn communicates with the valve body opening 66.

Means are provided for supplying sterilizing steam to the various parts of the loading valve 60, and as shown in the drawings these means may include the steam supply line 100 which is connected by means of a T fitting 101 and suitable pipes 102 and 103 to steam junction boxes 104 and 105. Each of these boxes, which are suspended from the frame 10 by means of supports 106, is provided with outlet ports 107 and 108, leading to steam lines 109 and 110, respectively. A pair of lines 109 and 110 is provided for each of the loading valves 60, although, as pointed out above, only one is shown in the drawings.

The steam line 109 is connected to the leg 112 of the Y fitting 61 and is provided with a control valve 113. The line 110 communicates with the valve body 65 through a port 114 immediately above the central opening 66, and is provided with a suitable control valve (not shown). From the above description it will be understood that steam may be admitted through the port 114 to force the piston 76 and filling tube 75 upwardly from the position shown in Figure 7 to that shown in Figure 8. Steam exhaust line 115, provided with a check valve shown diagrammatically at 116, leads from a port 117 in the valve body opening 66.

Means are provided for sealing off the filling tube when it is retracted to the position shown in Figure 8, and as shown in the drawings, these means may include the arcuate groove 118 in the wall of the cylinder 63 and the transverse slot 119 in the piston 76. When the tube 75 is in the sterilizing and filling position shown in Figure 7, fluid may flow down through the cylinder 63, through the respective groove 118 and slot 119 and thence down through the filling tube proper. When the filling tube is in the retracted position shown in Figure 8, however, the entire peripheral surface of the unslotted portion of the piston 76 is in sealing contact with the walls of the cylinder 63.

Condensate drainage means are provided for each of the barrels 37, and as shown best in Figures 5 and 6, these means include a nipple 120 welded to the barrel and in communication therewith through barrel aperture 121. The nipple is provided with external threads and secured thereto is a manifold 122. Threadedly engaged in the central opening of the nipple 120 is a plug 123 which in turn is provided with an internally-threaded opening 125. Threadedly engaged in this opening is a second plug 126. The two plugs are oppositely-threaded, that is the external threads of one plug are "right-hand" and those of the other are "left-hand" so that upon loosening of the plug 126, the threaded engagement between the plug 123 and nipple 120 will not be disturbed. The plug 126 is provided with a non-circular recess 127 and engaged therein is the end of a key 128 which extends through an aperture 130 in the manifold 120 and which is provided with a handle portion 131 for manipulation of the same.

Figure 2:
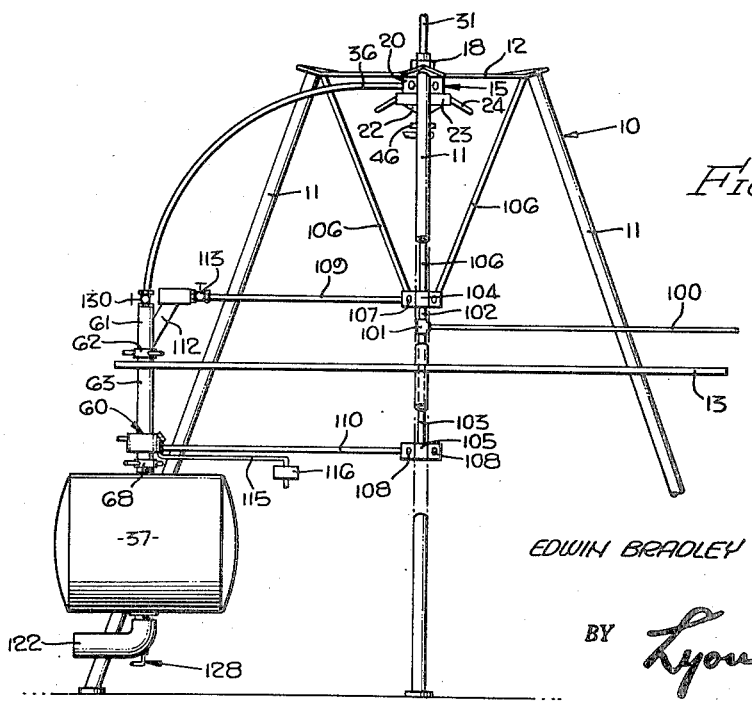
Figure 2 is a side elevation of the sterilizing and filling apparatus.

It is preferred to operate the apparatus described above in connection with a flash sterilizer (not shown), a device familiar to those skilled in the art, which device is adapted to quickly and continuously sterilize fluid materials. For operation of the apparatus embodying this invention, the delivery tube 31 is connected to the product outlet (not shown) of the flash sterilizer, and the barrels 37 connected as shown in Figures 1 and 2. To make these connections, control valve 130 immediately above the Y fitting 61 is closed and steam is admitted through port 114 to force the filling tube upwardly into the cylinder 63. A control valve (not shown) is provided in the exhaust line 115, and this is likewise closed to permit build-up of steam pressure. With the tube retracted, the barrel 37 is placed under the device so that the nipple 67 is engaged with the nut 69 which is tightened by means of the handles 131. Steam at 114 is shut off and steam admitted through line 109 to depress the filling tube to the filling position shown. Plug 83 is removed, the spherical ball 84 is inserted to rest against the filling tube, and the plug is replaced. The reservoir 86 may then be filled with a measured amount of paraffin or other sealing compound and its plug tightened. It will thus be understood that the interiors of the barrels 37 are now hermetically connected to the produce piping including the inlet tube 31.

The apparatus is now in condition for the initial sterilization which must be undergone before a day's operations may be commenced. This is accomplished by manipulating the controls of the apparatus so that steam under pressure will be held for a sterilizing length of time in all parts of the apparatus which are to come in contact with the fluid to be handled and loaded into the barrels. The valve (not shown) for the inert gas inlet line 50 is closed, condensate outlet 38 is opened, and the valve member 27 is brought down off its seat to the position shown in Figure 4. Valve 130 is opened, valve 113 is closed, and sterilizing steam from the flash sterilizer is admitted into the selector valve 15 through the inlet tube 31. The steam will pass outwardly through each of the outlet tubes 36, through the various loading valve devices 60 and thence into the barrels 37.

Steam condensate gravitates to the bottom of the barrels and is released by means of the condensate drainage device described above. The plug 126 is "cracked" open by turning the key 128 in the appropriate direction and held there until water ceases to flow out of the manifold 122 and only steam escapes. After sterilization has been completed, plug 126 is tightened to prevent leakage therethrough.

After the apparatus has been subjected to the live steam for a length of time sufficient for effective sterilization, steam flow from the flash sterilizer is stopped and the valve member 27 returned to the seated position shown in Figure 3. The control valve in the exhaust line 115 is opened to allow the pressure to escape, back-flow of contamination being prevented by the check valve 116. An inert (oxygen-free) scavenging gas, such as air which has been sterilized in a suitable burner, nitrogen or some other inert gas, is admitted into the system through the inlet line 50. This gas feeds through all of the passages 51 into the various outlet lines 36 and into the barrels, condensing and forcing out all residual steam. The device is now ready to accept a continuous flow of the sterile fluid from the flash sterilizer.

The sterile fluid flows from the inlet line 31, through the passage 35, then into the appropriate outlet line 36, and then downwardly into the barrel 37. At the same time, it will be understood that oxygen-free gas continues to flow into each of the other outlet tubes and barrels 37 to keep sterile that part of the system not then in the loading operation. When a flow meter (not shown) indicates that the particular barrel 37 being loaded is full, the stream of sterile fluid is directed, by turning handle 46, to the next adjacent outlet 36 and barrel 37. The connections to the barrel just filled are cleared by oxygen-free gas from the appropriate passage 51, which passage replaces the passage 35 when the valve member 27 is axially rotated by turning the handle 46.

The operation of the loading valve 60 is as follows: When the barrel is full and flow of sterile fluid has been diverted therefrom to the next adjacent barrel as pointed out above, oxygen-free gas is flowing through the system and out through the exhaust line 115. Steam, under a higher pressure than that of the inert gas, is let in through the port 114 and under the piston 76, thus carrying the filling tube 75 up into cylinder 63. As the lower end of the tube 75 moves upwardly past the ball 84, the ball is free to drop to the position shown in Figure 8 in sealing relation with the seat, thus closing off the barrel. The filling tube 75 may now be brought down against the ball to insure its proper seating. The tube is again retracted and steam is fed into the paraffin reservoir through inlet line 89. The paraffin, now in a fluid state due to the heat of sterilization, is thus caused to rise in stand pipe 90 and to flow down to cover the ball 84, the plug 70 and all possible orifices through which contamination might reach the contents of the barrel. The paraffin, which solidifies on cooling, is indicated at 140 in Figure 8.

The loading valve device is then detached from the barrel by releasing the nut 68 and is ready to be attached to a new barrel as described above. A cap (not shown) with a suitable washer is screwed onto the nipple 67 to make the paraffin seal permanent. The barrel is then rolled over, manifold 122 is removed and hot paraffin 141 or other sealing material is poured into the nipple 120 to seal any possible apertures through which contamination might enter. The operation is ended by securing a cap 142 to the nipple (Figure 6), and the barrel is ready to be marketed. The plugs 70 and 123 are each provided with a pair of lugs 143 and 144, respectively, adapted to take a suitable key for opening the barrel when access to the contents is desired.

With the use of the selector valve 15 and the plurality of connections and barrels 37, a continuous flow of sterile fluid from the flash sterilizer may be handled. It should be pointed out that after the daily initial sterilization of the apparatus with steam from the sterilizer which steam enters through the inlet pipe 31, sterilization of barrels subsequent to the first six is accomplished by feeding steam from the junction box 104, through the lines 109 and leg 112, and thence downwardly into the barrels. The sequence of operations is otherwise the same as that described above.

Having fully described my invention, it is to be understood that I do not wish to be limited to the details herein set forth, but my invention is of the full scope of the appended claims.

I claim:

1. In apparatus for sterilizing containers and aseptically loading the same with a pre-sterilized fluid, the combination of a frame; a selector valve secured to said frame, said valve including an inlet port, a plurality of outlet ports, a selectively operable valve member having a passage adapted to establish communication between said inlet port and a selected one of said outlet ports, and means for establishing simultaneous communication between said inlet port and all of said outlet ports; an inlet line for pre-sterilized fluid leading to said selector valve through said inlet port; a plurality of outlet lines leading from said outlet ports; and a loading valve device connected with each of said outlet lines at the ends thereof remote from the selector valve, each of said loading valve devices having a fitting adapted to connect the same to the opening of a container to be sterilized and loaded.

2. In apparatus for sterilizing containers and aseptically loading the same with a pre-sterilized fluid, the combination of a frame; a selector valve secured to said frame, said valve including an inlet port, a plurality of outlet ports, a selectively operable valve member having a passage adapted to establish communication between said inlet port and a selected one of said outlet ports, and means for simultaneously establishing communication between said inlet port and all of said outlet ports; an inlet line for pre-sterilized fluid leading to said selector valve through said inlet port; a plurality of outlet lines leading from said outlet ports; and a loading valve device connected with each of said outlet lines at the ends thereof remote from the selector valve, each of said loading valve devices having a fitting adapted to connect the same to the opening of a container to be sterilized and loaded, and each of said loading valve devices including means for sealing the container opening.

3. In apparatus for sterilizing and loading a container of the type having an opening defined by a member having a recess with a spherical seat, a loading valve device comprising a valve body having a central opening, said body adapted to be releasably secured to said spherical-seated member, a cylinder secured to said body member, a filling tube extending from said cylinder through an aperture in the valve body into said central opening, said filling tube being adapted to reciprocate from a loading position wherein the end of the tube extends into the container opening to an inoperative position wherein the end of the tube is retracted upwardly into the central opening, a downwardly inclined bore in said valve body communicating with said central opening, and a spherical ball in said bore, the ball being supported therein by the filling tube when in the loading position, the ball being free to drop by gravity into the spherical seat upon movement of the filling tube to the inoperative position.

4. In apparatus for sterilizing and loading a container of the type having an opening defined by a member having a recess with a spherical seat, a loading valve device comprising a valve body having a central opening, said body adapted to be releasably secured to said spherical-seated member, a cylinder secured to said body member, and a filling tube extending from said cylinder through an aperture in the valve body into said central opening, said filling tube being adapted to reciprocate from a loading position wherein the end of the tube extends into the container opening to an inoperative position wherein the end of the tube is retracted upwardly into the central opening, a downwardly-inclined bore in said valve body communicating with said central opening, a spherical ball in said bore, the ball being supported therein by the filling tube when in the loading position, the ball being free to drop by gravity into the spherical seat upon movement of the filling tube to the inoperative position, and means within said valve body for applying a charge of molten sealing material to cover the ball and seat.

5. In apparatus for sterilizing and loading a container of the type having an opening defined by a member having a recess with a spherical seat, a loading valve device comprising a valve body having a central opening, said body adapted to be releasably secured to said spherical-seated member, a cylinder secured to said body member, and a filling tube extending from said cylinder through an aperture in the valve body into said central opening, said filling tube being adapted to reciprocate from a loading position wherein the end of the tube extends into the container opening to an inoperative position wherein the end of the tube is retracted upwardly into the central opening, a downwardly-inclined bore in said valve body communicating with said central opening, a spherical ball in said bore, the ball being supported therein by the filling tube when in the loading position, the ball being free to drop by gravity into the spherical seat upon movement of the filling tube to the inoperative position, a chamber for molten sealing material formed in said valve body adjacent said central opening, a stand pipe leading from a point adjacent the bottom of said chamber into said central opening, and means for applying pressure to said chamber to force molten sealing material through said stand pipe, through said central opening and into the recess in said spherical-seated member.

6. In apparatus for sterilizing and loading a container of the type having an opening defined by a member having a recess with a spherical seat, a loading valve device comprising a valve body having a central opening, said body adapted to be releasably secured to said spherical-seated member, a cylinder secured to said body member, and a filling tube extending from said cylinder through an aperture in the valve body into said central opening, said filling tube being adapted to reciprocate from a loading position wherein the end of the tube extends into the container opening to an inoperative position wherein the end of the tube is retracted upwardly into the central opening, a spherical ball releasably supported within said valve body and above the recess in said spherical-seated member, said ball adapted to be released, upon completion of the loading of said container, to fall by gravity into the spherical seat.

7. In apparatus of the character described, a loading valve device comprising a valve body having a central opening; a vertical cylinder secured to the upper part of said valve body and above said central opening; and a filling tube extending from said cylinder through an aperture in the valve body into said central opening, said filling tube being adapted to be vertically reciprocated within said cylinder from an extended position to a retracted position, the upper portion of the filling tube carrying a hollow piston closely fitting the inner cylinder wall, said piston being closed at the top thereof and having a transverse slot therein, the inner wall of the cylinder having an arcuate groove in the lower portion thereof, said groove adapted to cooperate with said slot in providing a passage for the flow of fluid from said cylinder into said filling tube only when said tube is in the extended position, the inner wall of said cylinder acting to seal the slot when said filling tube is in the retracted position.

8. In apparatus for sterilizing and loading a container of the type having an opening defined by a member having a recess with a spherical seat, a loading valve device comprisnig a valve body having a central opening, said body adapted to be releasably secured to said spherical-seated member, a cylinder secured to said body member, and a filling tube extending from said cylinder through an aperture in the valve body into said central opening, said filling tube being adapted to reciprocate from a loading position wherein the end of the tube extends into the container opening to an inoperative position wherein the end of the tube is retracted upwardly into the central opening, a downwardly-inclined bore in said valve body communicating with said central opening, a spherical ball in said bore, the ball being supported therein by the filling tube when in the loading position, the ball being free to drop by gravity into the spherical seat upon movement of the filling tube to the inoperative position, and cooperating means on said filling tube and in said cylinder for sealing said filling tube against the passage of fluid therethrough when the filling tube is in the retracted position.

9. In apparatus of the character described, a selector valve comprising a body having a chamber with walls forming a seat, an inlet port leading to said chamber, a plurality of outlet ports leading from said chamber, a valve member mounted for axial rotation in said chamber, and means for normally urging said valve member into sealing relation with said seat whereby said outlet ports are closed by said valve member, means for establishing communication between said inlet port and one of said outlet ports upon rotation of said valve member, said valve member being axially movable to an open position spaced from said seat whereby communication is simultaneously established through siad chamber between the inlet port and all of said outlet ports.

10. In apparatus of the character described, a selector valve comprising a body having a chamber with walls forming a seat, an axial inlet port leading to said chamber, a plurality of radial outlet ports leading from said chamber, a valve member having a passage therethrough and mounted for axial rotation in said chamber, said passage having an axial inlet and a radial outlet, means for normally urging said valve member into sealing relation with said seat whereby said outlet ports are closed by said valve member, said passage outlet being aligned with said outlet ports when said valve member is in sealing relation with said seat whereby communication through said passage may be selectively established between said inlet port and one of said outlet ports by rotation of said valve member, and means in said valve for simultaneously delivering an inert scavenging gas to the remainder of said outlet ports, said valve member being axially movable to an open position spaced from said seat whereby communication is simultaneously established through said chamber between the inlet port and all of said outlet ports.

11. In apparatus of the character described, a selector valve comprising a body having a chamber with conical walls forming a seat, an inlet port leading to said chamber, a plurality of outlet ports leading from said chamber, a conical valve member mounted for axial rotation in said chamber, and means for normally urging said valve member into sealing relation with said seat whereby said outlet ports are closed by said valve member, means for selectively establishing communication between said inlet port and one of said outlet ports upon rotation of said valve member, and an inlet line for inert scavenging gas leading to said chamber below said valve member, said valve member having a plurality of vertical passages therein leading from the portion of the chamber below the valve member, said vertical passages, with the outlet from said first passage, being spaced so that when the outlet is in communication with one of said outlet ports, one of the vertical passages is in communication with each of the remaining outlet ports whereby inert scavenging gas may be simultaneously delivered thereto.

12. In apparatus of the character described, the combination of a container having an opening; a nipple member secured to said container; a plug removably connected to said nipple member and having a recess including a spherical seat and an aperture leading to the interior of said container through said opening; a loading valve device comprising a valve body having a central opening, said body being releasably secured to said nipple member; a cylinder secured to said body member above said central opening; and a filling tube extending from said cylinder through an aperture in the valve body into said central opening, said filling tube being adapted to reciprocate from a loading position wherein the lower end of the tube extends into the container opening to an inoperative position wherein the end of the tube is retracted upwardly into the central opening; and a spherical ball releasably supported within said valve body and above the recess in said plug; and means for releasing said ball, upon completion of the loading of said container, whereby said ball falls by gravity into the conical seat.

13. In apparatus of the character described, the combination of a container having an opening; a nipple member secured to said container; a plug removably connected to said nipple member and having a recess including a spherical seat and an aperture leading to the interior of said container through said opening; a loading valve device comprising a valve body having a central opening, said body being releasably secured to said nipple member; a cylinder secured to said body member above said central opening; and a filling tube extending from said cylinder through an aperture in the valve body into said central opening, said filling tube being adapted to reciprocate from a loading position wherein the lower end of the tube extends into the container opening to an inoperative position wherein the end of the tube is retracted upwardly into the central opening; a spherical ball releasably supported within said valve body and above the recess in said plug; and means for releasing said ball, upon completion of the loading of said container, whereby said ball falls by gravity into the conical seat, and means within said valve body for applying a charge of molten sealing material to cover the ball and seat.

14. In apparatus for sterilizing and loading a container of the type having an opening defined by a member having a recess with a spherical seat, a loading valve device comprising a valve body having a central opening, said body adapted to be releasably secured to said spherical-seated member, and a filling tube extending through an aperture in the valve body into said central opening, said filling tube being adapted to reciprocate from a loading position wherein the end of the tube extends into the container opening to an inoperative position wherein the end of the tube is retracted upwardly into the central opening, a downwardly-inclined bore in said valve body communicating with said central opening, a spherical ball in said bore, the ball being supported therein by the filling tube when in the loading position, the ball being free to drop by gravity into the spherical seat upon movement of the filling tube to the inoperative position, a chamber for molten sealing material formed in said valve body adjacent said control opening, a stand pipe leading from a point adjacent the bottom of said chamber into said central opening, and means for applying pressure to said chamber to force molten sealing material through said stand pipe, through said central opening and into the recess in said spherical-seated member.

References Cited in the file of this patent

UNITED STATES PATENTS

| Number | Name | Date |
|---|---|---|
| 36,126 | Preston | Aug. 5, 1862 |
| 931,649 | Redington | Aug. 17, 1909 |
| 1,242,873 | Schroder | Oct. 9, 1917 |
| 1,572,190 | Don | Feb. 9, 1926 |
| 2,051,013 | Schulse | Aug. 11, 1936 |
| 2,204,832 | Stewart | June 18, 1940 |
| 2,297,190 | McKinnis | Sept. 29, 1942 |
| 2,340,102 | Barr | Jan. 25, 1944 |
| 2,361,640 | McKinnis | Oct. 31, 1944 |
| 2,609,984 | Barnes | Sept. 9, 1952 |

FOREIGN PATENTS

| Number | Country | Date |
|---|---|---|
| 849,505 | France | Aug. 5, 1938 |